(12) United States Patent
Sergeev

(10) Patent No.: US 12,180,416 B2
(45) Date of Patent: *Dec. 31, 2024

(54) METHOD FOR PREVENTING STRATAL WATER FROM BREAKING THROUGH INTO BOTTOM HOLES OF WELLS

(71) Applicant: LIMITED LIABILITY COMPANY "GR PETROLEUM", Moscow (RU)

(72) Inventor: Vitalii Vyacheslavovich Sergeev, Moscow (RU)

(73) Assignee: LIMITED LIABILITY COMPANY "GR PETROLEUM", Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 17/758,999

(22) PCT Filed: Dec. 8, 2020

(86) PCT No.: PCT/RU2020/050368
§ 371 (c)(1),
(2) Date: Jul. 18, 2022

(87) PCT Pub. No.: WO2021/150142
PCT Pub. Date: Jul. 29, 2021

(65) Prior Publication Data
US 2023/0033325 A1 Feb. 2, 2023

(30) Foreign Application Priority Data
Jan. 21, 2020 (RU) .................. RU2020102255

(51) Int. Cl.
*C09K 8/50* (2006.01)
*C09K 8/42* (2006.01)
(Continued)

(52) U.S. Cl.
CPC ............. *C09K 8/50* (2013.01); *C09K 8/42* (2013.01); *E21B 33/138* (2013.01); *E21B 43/32* (2013.01)

(58) Field of Classification Search
CPC .......... C09K 8/50; C09K 8/502; C09K 8/504; C09K 8/506; C09K 8/5045; C09K 8/516;
(Continued)

(56) References Cited

U.S. PATENT DOCUMENTS 3,060,210 A * 10/1962 De Groote .............. C23F 11/14
507/131
3,956,145 A * 5/1976 Christopher, Jr. ...... E21B 43/20
507/224
(Continued)

FOREIGN PATENT DOCUMENTS

RU 2136877 C1 9/1999
RU 2174587 C2 10/2001
(Continued)

OTHER PUBLICATIONS

Translation of WO-2018044200-A1 (Year: 2018).*
(Continued)

*Primary Examiner* — Angela M DiTrani Leff
(74) *Attorney, Agent, or Firm* — Perilla Knox & Hildebrandt LLP

(57) ABSTRACT

A method for preventing stratal water from breaking into bottom holes of gas, gas-condensate, or gas-hydrate wells includes performing an injection of a shielding agent into a bottomhole formation zone, for which an emulsion-suspension system (ESS) is used. The ESS system includes: 5-12 vol % of diesel fuel, 2-3 vol % of emulsifier, and 1.0-1.5 vol % of colloidal nano-particles of silicon dioxide, with the remainder being an aqueous solution of calcium chloride or potassium chloride. The emulsifier used is a composition
(Continued)

| ESS sample No. | ESS composition, % by vol. | | | | | Density, kg/m³ |
|---|---|---|---|---|---|---|
| | Hydrocarbons | | Emulsifier | Colloidal nanoparticles | Aqueous solution of salts | |
| | Diesel fuel | Oil | | | | |
| 1 | 5 | - | 3.0 | 1.5 | 90.5 | 1,183 |
| 2 | 6 | - | 3.0 | 1.5 | 89.5 | 1,180 |
| 3 | 8 | - | 2.5 | 1.3 | 88.2 | 1,174 |
| 4 | 10 | - | 2.3 | 1.2 | 86.5 | 1,171 |
| 5 | 12 | - | 2.0 | 1.0 | 85.0 | 1,163 |
| 6 | - | 12 | 2.0 | 1.0 | 85.0 | 1,167 |
| 7 | - | 10 | 2.3 | 1.2 | 86.5 | 1,175 |
| 8 | - | 8 | 2.5 | 1.3 | 88.2 | 1,177 |
| 9 | - | 6 | 3.0 | 1.5 | 89.5 | 1,185 |
| 10 | - | 5 | 3.0 | 1.5 | 90.5 | 1,188 | comprising: 40-42 vol % of esters of linoleic or oleic acids and resin acids, 0.7-1 vol % of amine oxide, 0.5-1 vol % of lime-in-diesel fuel suspension or bentonite-in-diesel fuel suspension, with the remainder being diesel fuel.

2 Claims, 2 Drawing Sheets

(51) Int. Cl.
  *E21B 33/138* (2006.01)
  *E21B 43/32* (2006.01)
(58) Field of Classification Search
  CPC ....... C09K 23/34; E21B 33/13; E21B 33/138; E21B 43/32
  See application file for complete search history.

(56) References Cited

U.S. PATENT DOCUMENTS

| | | | |
|---|---|---|---|
| 4,276,935 A | 7/1981 | Hessert et al. | |
| 6,068,054 A * | 5/2000 | Bragg | C09K 8/502 507/904 |
| 6,165,948 A | 12/2000 | Dewenter et al. | |
| 11,008,499 B2 * | 5/2021 | Sergeev | C09K 8/5045 |
| 11,162,023 B2 * | 11/2021 | Sergeev | C09K 8/92 |
| 11,248,161 B2 * | 2/2022 | Sergeev | C09K 8/72 |
| 11,261,718 B2 * | 3/2022 | Sergeev | C09K 8/584 |
| 11,414,953 B2 * | 8/2022 | Sergeev | C04B 28/24 |
| 11,620,023 B1 * | 4/2023 | He | G06F 3/044 345/173 |
| 2009/0211758 A1 | 8/2009 | Bragg et al. | |
| 2010/0224366 A1 * | 9/2010 | Lende | C04B 28/02 166/292 |
| 2014/0116695 A1 * | 5/2014 | Maghrabi | C09K 8/36 166/279 |
| 2016/0017204 A1 * | 1/2016 | Hill | C09K 8/74 166/305.1 |

FOREIGN PATENT DOCUMENTS

| | | | | |
|---|---|---|---|---|
| RU | 2438009 C1 | 12/2011 | | |
| RU | 2534373 C1 | 11/2014 | | |
| RU | 2569941 C2 | 12/2015 | | |
| RU | 2631460 C1 | 9/2017 | | |
| RU | 2670307 C1 | 10/2018 | | |
| WO | WO-2018044200 A1 * | 3/2018 | | C09K 8/502 |
| WO | WO-2019039974 A1 * | 2/2019 | | C04B 28/24 |

OTHER PUBLICATIONS

Translation of WO-2019039974-A1 (Year: 2019).*
International Search Report for International Application No. PCT/RU2020/050368 mailed Jul. 29, 2021.
Written Opinion for International Application No. PCT/RU2020/050368 mailed Jul. 29, 2021.

* cited by examiner

| No. | Special tools and equipment | Unit | Number, pcs. | Purpose |
|---|---|---|---|---|
| 1 | Process tank with blade mixer and external pump | piece | 1 | ESS preparation |
| 2 | Line (tubes, hoses) | set | 2 | Filling and discharge of process fluids |
| 3 | Pump unit | piece | 1 | Pumping and injection of process fluids into well |
| 4 | Tank truck | piece | 2 | Transportation of process fluids |
| 5 | Process tank | piece | 2 | Storage of process fluids at a well location |
| 6 | Measuring bar | piece | 1 | Measuring process fluid amounts |
| 7 | Areometer | piece | 1 | Measuring solution densities |

Fig. 1

| ESS sample No. | ESS composition, % by vol. | | | | | Density, kg/m$^3$ |
|---|---|---|---|---|---|---|
| | Hydrocarbons | | Emulsifier | Colloidal nanoparticles | Aqueous solution of salts | |
| | Diesel fuel | Oil | | | | |
| 1 | 5 | - | 3.0 | 1.5 | 90.5 | 1,183 |
| 2 | 6 | - | 3.0 | 1.5 | 89.5 | 1,180 |
| 3 | 8 | - | 2.5 | 1.3 | 88.2 | 1,174 |
| 4 | 10 | - | 2.3 | 1.2 | 86.5 | 1,171 |
| 5 | 12 | - | 2.0 | 1.0 | 85.0 | 1,163 |
| 6 | - | 12 | 2.0 | 1.0 | 85.0 | 1,167 |
| 7 | - | 10 | 2.3 | 1.2 | 86.5 | 1,175 |
| 8 | - | 8 | 2.5 | 1.3 | 88.2 | 1,177 |
| 9 | - | 6 | 3.0 | 1.5 | 89.5 | 1,185 |
| 10 | - | 5 | 3.0 | 1.5 | 90.5 | 1,188 |

Fig. 2

| ESS sample No. | ESS composition, % by vol. | | | | | Amount of separated water, % by vol. | Thermal stability |
|---|---|---|---|---|---|---|---|
| | Hydrocarbons | | Emulsifier | Colloidal nanoparticles | Aqueous solution of salts | | |
| | Diesel fuel | Oil | | | | | |
| 1 | 5 | - | 3.0 | 1.5 | 90.5 | 1 | stable |
| 2 | 6 | - | 3.0 | 1.5 | 89.5 | 0 | stable |
| 3 | 8 | - | 2.5 | 1.3 | 88.2 | 1 | stable |
| 4 | 10 | - | 2.3 | 1.2 | 86.5 | 2 | stable |
| 5 | 12 | - | 2.0 | 1.0 | 85.0 | 2 | stable |
| 6 | - | 12 | 2.0 | 1.0 | 85.0 | 1 | stable |
| 7 | - | 10 | 2.3 | 1.2 | 86.5 | 0 | stable |
| 8 | - | 8 | 2.5 | 1.3 | 88.2 | 0 | stable |
| 9 | - | 6 | 3.0 | 1.5 | 89.5 | 0 | stable |
| 10 | - | 5 | 3.0 | 1.5 | 90.5 | 0 | stable |

Fig. 3

| Shear velocity, s⁻¹ | Sample 7 | | | | Sample 8 | | | | Sample 10 | | | |
|---|---|---|---|---|---|---|---|---|---|---|---|---|
| | Shear stress, Pa | | Dynamic viscosity, mPa·s | | Shear stress, Pa | | Dynamic viscosity, mPa·s | | Shear stress, Pa | | Dynamic viscosity, mPa·s | |
| | Forward run | Reverse run | Forward run | Reverse run | Forward run | Reverse run | Forward run | Reverse run | Forward run | Reverse run | Forward run | Reverse run |
| 1.0 | 23.18 | 23.10 | 25071.4 | 24,998.8 | 14.00 | 13.30 | 15,342.1 | 15,180.9 | 32.50 | 29.26 | 27,050.8 | 26,114.0 |
| 10.0 | 108.77 | 87.94 | 12680.0 | 11,899.5 | 70.20 | 40.25 | 7,872.22 | 6,760.87 | 101.12 | 93.30 | 14,515.0 | 14,090.1 |
| 120.0 | 190.10 | 188.12 | 1545.9 | 1,511.0 | 115.12 | 111.42 | 952.08 | 1,019.25 | 175.90 | 169.51 | 2,090.64 | 1,990.41 |
| 700.0 | 333.20 | 336.61 | 415.8 | 411.6 | 269.43 | 264.70 | 370.26 | 371.55 | 483.45 | 460.10 | 692.00 | 680.09 |
| 1,300.0 | 456.20 | 447.55 | 320.9 | 311.9 | 377.80 | 375.05 | 287.33 | 280.31 | 450.80 | 432.35 | 510.12 | 490.28 |

Fig. 4

| Dynamic stability | | | |
|---|---|---|---|
| | Effective (apparent) viscosity, mPa·s at 20.0°C and shear velocity of 450.0 s⁻¹ | | |
| Test time, s | Sample 7 | Sample 8 | Sample 10 |
| 0 | 890.0 | 499.5 | 905.8 |
| 60 | 893.9 | 498.0 | 901.3 |
| 120 | 888.5 | 486.5 | 900.2 |
| 180 | 881.0 | 485.7 | 896.8 |
| 240 | 874.2 | 484.9 | 893.0 |
| 300 | 860.5 | 480.2 | 890.5 |
| 360 | 857.2 | 476.1 | 888.5 |
| 420 | 855.1 | 477.0 | 888.2 |
| 480 | 852.5 | 475.4 | 885.1 |
| 540 | 853.0 | 475.0 | 883.7 |
| 600 | 851.9 | 474.1 | 882.9 |

Fig. 5

METHOD FOR PREVENTING STRATAL WATER FROM BREAKING THROUGH INTO BOTTOM HOLES OF WELLS

CROSS-REFERENCE TO RELATED APPLICATIONS

This application is a national phase application under 35 U.S.C. § 371 of International Application No. PCT/RU2020/050368 filed Dec. 8, 2020 entitled "METHOD FOR PREVENTING STRATAL WATER FROM BREAKING THROUGH INTO BOTTOM HOLES OF WELLS," which claims the benefit of and priority to Russian Federation Patent Application No. 2020102255 filed Jan. 21, 2020, the contents of both of which being incorporated by reference in their entireties herein.

TECHNICAL FIELD

The present disclosure relates to the gas production industry and, in particular, to procedures of preventing breakthroughs of formation water into a bottom hole of gas, gas-condensate, or gas-hydrate wells.

BACKGROUND

Stratal water accompanies hydrocarbon deposits in most fields. Most frequently, stratal water is located in low zones of gas, gas-condensate, or gas-hydrate formations. However, in some cases, stratal water may be found in a section of a formation productive part and may create separate water-bearing horizons.

Generally, stratal water is classified into the following three types: irreducible water, bottom water, and edge water. The irreducible water is water remaining in a formation from the time when a deposit was formed. The bottom or edge water is water that fills voids of a reservoir under a productive formation and around it.

Interconnected water-bearing and productive parts of formations form a single hydrodynamic system which balance is affected when a deposit is developed. When the formation system balance is broken, filtration of formation fluids begins in a porous medium, and they are redistributed in the formation due changes in temperature and pressure.

The operation of producing wells drilled in gas, gas-condensate, or gas-hydrate formations is accompanied by creation of great pressure differences in the bottom hole, which facilitates drawing-in and breakthrough of bottom or edge stratal water. These phenomena lead to reduction of operating efficiency of a producing well up to its shutdown due to total water encroachment of the well and lack of economic practicability of continuing its operation.

Development efficiency of gas, gas-condensate, or gas-hydrate fields is determined by a degree of reserve production that greatly depends on a degree of rock heterogeneity. Macro- and micro-heterogeneity of formation rocks significantly influences speed of formation water movement into a gas-saturated part of the formation. Meanwhile, entrapped gas remains in a water-flooded part of the formation, and an amount of this gas depends on the reservoir properties and conditions of formation water flooding.

Development of gas-hydrate fields is based on the general principle—gas is converted from the bound hydrate state in the formation conditions into a free state with the following withdrawal through producing wells. The existing methods of converting gas from the hydrate state into free state are based on reduction of a formation pressure to a level below a hydrate decomposition pressure.

Three periods of the water displacement process may be singled out during development of water drive gas and gas-condensate fields: a waterless period, a combined period, and a period when pressure is reduced from an initial value to a final value. And the gas recovery factor is higher in sandstones than in carbonate rocks. The gas recovery factor decreases with an increase in water surface tension.

A. I. Shirkovsky derived the following formula for determining the gas recovery factor in a case where gas is displaced by water at a constant pressure:

$$\beta = \left(\frac{\mu_0}{\sigma_0}\right)^{1/8} \sqrt{\frac{\rho_i m_0}{2}}$$

where:
$\beta$—initial/recovered gas reserve ratio, unit fractions;
$\rho_i$—initial gas saturation, unit fractions;
$m_0$—absolute porosity factor of a formation, unit fractions;
$\sigma_0$—surface tension ratio at a current pressure at a gas-water interface $\sigma_i$ and at an initial pressure $\sigma_{p_i}$;
$\mu_0$—ratio between water viscosity $\mu_w$ and gas viscosity $\mu_g$ at a current pressure p at the gas-water interface and at an initial pressure $p_i$ $$\sigma_0 = \frac{\sigma_p}{\sigma_{p_i}}; \quad \mu_0 = \frac{\left(\frac{\mu_w}{\mu_g}\right)_p}{\left(\frac{\mu_w}{\mu_g}\right)_{p_i}}$$

The residual gas saturation factor $\alpha$ is a ratio between a pore space volume occupied by gas at a time of water breakthrough into an output cross-section of a model and a pore space volume of the model:

$$\alpha = (1-\beta)\rho_i = \left[1 - \left(\frac{\mu_0}{\sigma_0}\right)^{1/8}\sqrt{\frac{\rho_i m_0}{2}}\right]\rho_i$$

The influence of a number of circumstances on the gas recovery factor is still insufficiently studied.

The development of elastic water drive gas and gas-condensate fields is accompanied by a pressure reduction in a gas part of a formation and in the water-flooded zone. Entrapped gas is expanded and partially filtered into the gas saturated part of a formation. The physical processes going on in the water-flooded zone of the formation are insufficiently studied also.

The above evidences that a dependence exists between a rate and a degree of water flooding of hydrocarbon deposits and the gas recovery factor.

In this connection, in order to solve the task of increasing gas reserve development efficiency, it is necessary to implement methods for preventing stratal water breakthroughs into bottomhole of producing wells drilled in gas, gas-condensate, or gas-hydrate formations.

Patent RU 2569941 (IPC E21B 33/13, E21B 43/32, C09K 8/42, E21B 43/27, publ. on 10 Feb. 2015) describes a bottom water isolation method applicable in the oil- and gas-production industry for development of oil and gas fields. The method comprises perforation of the flow string in a water-flooded formation zone, injection of a hydrocarbon fluid for removing water from the bottomhole zone, hydrochloric acid treatment of the bottomhole zone for increasing permeability, flushing a water shutoff compound into the formation for the purpose of setting a water shutoff screen, additional reinforcement of the screen with a MICRODUR RU solution with sulphacell, setting of a cement plug in the water-flooded zone, testing its strength and hermeticity, washing of the well and development of the formation. The following compositions may be used as water isolation compositions: a modifier (113-53 or 113-85)+ethyl silicate (ETS-40 or ETS-16)+hydrophobic organic silicone liquid; ethyl silicate (ETS-40 or ETS-16)+synthetic racemic acid+ calcium chloride ($CaCl_2$). Main disadvantages of the method are: irreversible nature of the blocking effect, a plurality of implementation stages, complicated implementation of this method in the field conditions of an oil- and gas production due to the necessity of perforating the flow string and carrying out hydrochloric acid treatment of the formation bottomhole zone, the necessity of additionally reinforcing of the water isolation screen, additional man-hours.

U.S. Pat. No. 6,165,948 (IPC C09K 8/035, E21B 43/32, E21B 21/06, E21B 43/16, publ. on 26 Dec. 2000) discloses a method for drying out rock containing immobile formation water in the intake radius of natural gas wells and gas storage wells. According to this method, water-containing rock is rendered hydrophobic with the use of a dispersion comprising the following components: A) a water-repellent active compound, B) a hydrophilic water-dispersion medium, and, optionally, C) a dispersant. In particular, hydrophobized inorganic substances or polymeric organic-silicon compounds may be used as water-repellent compounds (A). Examples of said hydrophobized inorganic substances are, in particular, silicon/aluminum mixed oxides. Disadvantages of this method are: complexity of the method implementation due to the multicomponent chemical composition and the presence of polymeric compounds in the composition which reaction times are unpredictable; complexity due to the necessity of preparing the composition on a commercial scale and injecting it in a formation with filtration therein, which does not enable to efficiently prevent formation water breakthroughs into a well; impossibility of adjusting rheological parameters of the polymeric systems used as the water-repellent compound; and the irreversible nature of the blocking effect. The multicomponent chemical composition, as proposed in this method, is sensitive to mineralization and chemical composition of the water dispersion medium.

U.S. Pat. No. 4,276,935 (IPC C09K 8/502, C09K 8/82, E21B 43/32, publ. on 7 Jul. 1981) discloses a treatment method for subsurface gas-bearing formations to reduce water production therefrom. Excessive water production from a producing gas well is substantially reduced by the injection of a hydrocarbon-diluted water-in-oil emulsion comprising a viscosifying polymer such as polyacrylamide, the injected emulsified polymer swelling on contact with connate water in the subsurface gas producing formation to restrict transfer of water therethrough toward the producing gas well. Disadvantages of this method are: lowered operating efficiency of a well due to the use of polymeric compounds that are characterized by high sensitivity to mineralization and chemical composition of process and formation water and due to unpredictable rheology in the process of injection into a well and filtration into a formation; and the irreversible blocking effect.

Patent RU 2534373 (IPC E21B 43/32, publ. on 27 Nov. 2014) describes a method for shutoff of stratal water influx in gas and gas-condensate wells by means of coil tubing technique. This method ensures the possibility of isolating flow of formation water without killing wells, while maintaining gas-saturated formation thickness. The method comprises lowering a flexible pipe into the inner cavity of the gas well lift column to the bottomhole and cleanout of the bottomhole from liquid and mechanical impurities, filling the well with gas condensate, then, lifting the flexible pipe up to the lift column shoe, injecting to the perforated zone through the annular space between the flexible pipe and the lift column the first pack of a hydrophobizing compound comprising ethyl silicate ETS-40 with 10% concentration in gas condensate in an amount of 1-2 $m^3$ per each meter of the formation thickness; and, then, flushing it into the formation and forming a water shutoff screen in the producing formation, thus pushing stratal water from the bottomhole to the formation depth radially. Then, a second pack of a hydrophobizing compound comprising ethyl silicate ETS-40 with 100% concentration is injected in an amount of 0.4-0.6 $m^3$ per each meter of the effective formation thickness and is flushed into the formation with gas condensate in the volume of the lift column and the well inner space—flow string below the lift column shoe. After that, the flexible pipe is lowered into the gas-water contact zone once again, the GKZh-11N hydrophobic organic silicon liquid is injected through the flexible pipe in an amount of 0.10-0.15 $m^3$ per each meter of the formation water-bearing thickness, and the well is flushed back in the amount of two cycles with counter-pressure. The flexible pipe is removed from the well, and the latter is left to react under pressure. Disadvantages of this method are: technological complexity of carrying out the process of injecting the compounds into a well, lowered efficiency of restricting formation water breakthroughs into a producing well due to the use of chemical compositions providing irreversible and uncontrolled blocking effect with small penetration into the formation depth.

Patent RU 2136877 (IPC E21B 43/32, E21B 33/13, publ. on 10 Sep. 1999) discloses a method for isolation of bottom water in gas and gas condensate wells. The method comprises injection of liquid hydrocarbons into the production string after the well operation is stopped and started again in a certain time, wherein a calculated amount of liquid hydrocarbons is injected in batches in certain time periods, and spent oil products with addition of surfactants facilitating hydrophobization of reservoir rock in the bottomhole zone are used as said liquid hydrocarbons. Further, said liquid hydrocarbons are injected when traces of stratal water appear in the product of a gas well. The disadvantage of this method is lowered efficiency of preventing stratal water breakthroughs into a producing well in the conditions of bottomhole pressure differences created during operation of gas and gas condensate wells due to the use of the low-viscosity composition aimed only at hydrophobization of filtration channel surfaces.

Patent RU 2438009 (IPC E21B 43/16, publ. on 27 Dec. 2011) discloses a method for development of gas-hydrate deposits. The proposed method ensures an increase in gas recovery and an increase in a hydrate-free well operation period owing to reducing water saturation in a zone located below the gas-hydrate formation bottom, and, consequently, reduces the possibility of hydrate self-preservation. This method consists in that a well is drilled in a producing formation and an underlying isolated water-bearing stratum. Then, a production string with an immersed pump unit are lowered into the well, and a gas-liquid mixture is recovered from the gas-water interface of the producing formation. Simultaneously, the gas-liquid mixture is separated in the well. Gas is recovered through the annular space, and the liquid with dissolved gas is recovered through the production string, the liquid being pumped by means of said immersed pump unit into said water-bearing stratum. The disadvantage of the method is the impossibility of adjusting the hydrate-formation process in the conditions of multi-phase filtration of water-gas mixture. This method does not provide setting of a water-tight shield in the well bottomhole zone in a gas-bearing formation, but, rather, is directed at drilling in an underlying water-bearing stratum with their further joint operation, i.e. this method does not provide for prevention of formation water breakthroughs into a producing well, and, due to this, is not effective.

BRIEF SUMMARY

In order to solve the above problems in development of gas, gas-condensate, or gas-hydrate fields, a method for preventing stratal water from breaking through into bottom holes of producing wells is proposed that is based on injection of an emulsion-suspension system containing silicon dioxide nanoparticles into a well bottomhole zone in a formation (FBZ). In this specification, gas, gas-condensate, or gas-hydrate wells are referred to as producing wells.

The method comprises injection of a shielding agent into FBZ; an emulsion-suspension system (ESS) containing silicon dioxide nanoparticles is used as said shielding agent, the system comprising (% by vol.): diesel fuel or processed oil from an oil processing and pumping station—5-12, an emulsifier—2-3, colloidal nanoparticles of silicon dioxide—1.0-1.5, an aqueous solution of calcium chloride or potassium chloride—the rest; a composition, comprising (% by vol.): esters of higher unsaturated fatty acids and resin acids—40-42, amine oxide—0.7-1, a high-molecular organic thermostabilizer—0.5-1, diesel fuel—the rest, is used as the emulsifier; a composition, comprising (% by vol.): silicon dioxide—31-32.5 in propylene glycol monomethyl ether—67-68, water—the rest; or silicon dioxide—30-31 in isopropanol—67-68 and methyl alcohol—the rest; or silicon dioxide—29-31 in ethylene glycol—the rest, is used as the colloidal nanoparticles of silicon dioxide.

The technical effect includes reducing water-cut of well products, reducing harmful impacts on the environment owing to reversibility of the blocking effect of the shielding agent, simplifying implementation of the method due to its one-stage process, the possibility of adjusting rheological parameters of the shielding agent, reduced labor inputs and improved operating technological efficiency of gas, gas-condensate, or gas-hydrate wells.

BRIEF DESCRIPTION OF THE FIGURES

The disclosure is illustrated with the following graphic materials.

FIG. 1 shows a table describing tools and equipment for preparing and pumping the ESS into a producing well.

FIG. 2 shows a table illustrating results of measuring a density of ESS (density of the water component is 1200 kg/m$^3$).

FIG. 3 shows a table illustrating results of measuring a thermal stability of ESS at 140° C.

FIG. 4 shows a table illustrating results of measuring a dynamic viscosity of ESS.

FIG. 5 shows a table illustrating dependence of an effective viscosity of ESS on test duration (dynamic stability) at the temperature of 20.0° C. and shear velocity of 450.0 s$^{-1}$.

DETAILED DESCRIPTION

The method is based on placing a calculated ESS volume radially at the interface of a producing formation and a water-bearing stratum, which enables to create a shield impermeable for stratal water filtering into a near-wellbore zone of the productive formation. The unique physical properties of the ESS enable to apply the method efficiently in formations with anomalous temperatures and, at the same time, adjust the blocking properties of the shielding agent, depending on formation conditions and well operation conditions, by changing the components volumetric ratio.

The main unique physical properties of ESS are: high thermal (140° C.) stability and filtration stability, capability of adjusting rock surface wettability, self-regulated viscosity during the injection process and filtration into formation.

Shear gradient values and dynamic viscosity can be regulated within wide range alongside with the ESS stability and surface activity to ensure reliable blocking of water-bearing zones and facilitate hydrocarbon flow into a well. As the result of target injection of an ESS calculated volume, a radial shield is formed at the interface of a water-bearing stratum and a producing formation, its dimensions depend on density of producing well network and well operating conditions.

When the ESS is filtered in a rock porous medium, the system effective viscosity depends on volumetric water content and filtration rate, and increases with growth in volumetric water content and reduction in filtration rate. This fact can explain self-regulation of viscosity properties, rate and direction of ESS filtration deep into a formation.

Well Selection and Requirements to a Targeted Object

The following wells may be selected for implementation of the method:

gas;
gas-condensate;
gas-hydrate.

The following principal requirements are applied to the above wells:

a perforated zone and a well sump should be free from massive sediments, deposits and foreign objects hampering liquid filtration into perforated zones;

a casing string should be leak-proof;

a formation temperature is not limited, but should be determined before the work is started;

water intake capacity of a well should be at least 150 m$^3$/day at an intake wellhead pressure of not more than 120 atm, if said intake capacity is insufficient, the FBZ is treated by one of standard methods for increasing well intake capacity.

A volume of the ESS for injection is calculated according to the well-known method presented in the work by Orkin K. G. and Kuchinsky P. K. "Calculations in technology and process of oil production", Gostoptekhizdat, 1959. In order to calculate a volume of the ESS required for filling a rock cavity space in a certain radius from a well, the following formula may be used:

$$V = \pi \cdot (R_{out}^2 - r_w^2) \cdot h \cdot m \cdot (1 - SWL - SOWCR)$$

where:

V—calculated volume, m$^3$;

$R_{out}$—external radius of an emulsion system fringe, m;

$r_w$—well radius, m;

h—formation thickness, m;

m—reservoir porosity factor, unit fractions;

SWL—connate water saturation, unit fractions;

SOWCR—residual gas saturation, unit fractions

This method takes into account geometrical dimensions of an area of impact and reservoir properties. The use of connate water saturation and residual gas saturation in calculations enables to take into account a volume of porous space not involved in the filtration process.

Procedure of ESS Preparation

The ESS can be prepared in an emulsion system preparation unit (ESPU) that consists of a process tank with a blade mixer arranged therein and having a rotation speed not less than 90 rpm and an external centrifugal pump for circulating the ESS components. The process equipment required for preparing and injecting the ESS into producing wells is shown in FIG. 1.

The ESS preparation procedure with the use of the ESPU is staged and comprises the following steps:
- adding a calculated volume (5-12% by vol.) of diesel fuel or processed oil from an oil processing and pumping station into the ESPU process tank;
- starting the blade mixer and the centrifugal pump for circulation;
- adding a calculated volume of an emulsifier (2-3% by vol.) into the ESPU process tank;
- adding a calculated volume (1.0-1.5% by vol.) of colloidal nanoparticles silicon dioxide into the ESPU process tank;
- adding a calculated volume (the rest) of an aqueous solution of calcium chloride or potassium chloride into the ESPU process tank.

The components are introduced into the hydrocarbon base by means of a jet pump with the use of a vacuum hose. The component adding rate is limited by the jet pump intake capacity.

The process tank should be equipped with blade mixer ensuring constant and uniform distribution of the reactants over the whole volume. In order to provide and maintain the required stability properties of the system, the use of blade mixer with reversible rotation is recommended.

Preparation quality and stability properties of the system depend on full coverage of the ESPU process tank volume with mixing, cleanness of the process tanks, a component introduction velocity and a period of dispersion. The use of a tank with "skewed" corners (a shape close to cylindrical one) is recommended.

The ESS preparation quality control is conducted by checking sedimentation stability of the system. The test is considered as positive, if, after holding a 200 mL sample of the ESS at room temperature for 2 hours, not more than 2% of the ESS water component volume are separated.

A number and types of special tools and equipment for conducting works at a well are shown in FIG. 1. These are calculated on the condition that an ESS is prepared with the use of an ESPU. The presented list of the special tools and equipment is a basic one and may include additional items, depending on conditions of conducting the works, a location of the solution mixing plant, process parameters and structural features of a well.

Preparatory Works at a Well

Before starting the works on injecting the ESS into a well, the following preparatory works are performed on the well:
- the well is shut off and depressurized, operability of the stop valves on the wellhead equipment is checked;
- circulation in the well is checked, and a decision on a process fluid injection variant is taken;
- a current value of the formation pressure is determined;
- the equipment and tools for ESS injection are arranged in accordance with an approved layout;
- the equipment connections are made, and the injection line is tested for a pressure 1.5 times greater than an expected operating pressure, while observing safety requirements;
- the injection line is provided with a check valve.

Injection Procedure

In order to maintain continuous injection, a sufficient number of tank trucks carrying required volumes of fluids for conducting the operation should be on the well pad.

The method is carried out by continuously injecting the ESS calculated volume into a producing well, while continuously checking the principal injection parameters. The ESS comprises diesel fuel or processed oil from an oil processing and pumping station, an emulsifier, colloidal nanoparticles of silicon dioxide, an aqueous solution of calcium chloride or potassium chloride.

The ESS may comprise (% by vol.): diesel fuel or processed oil from an oil processing and pumping station—5-12, an emulsifier—2-3, colloidal nanoparticles of silicon dioxide—1.0-1.5, an aqueous solution of calcium chloride or potassium chloride—the rest. The emulsifier may comprise (% by vol.): esters of higher unsaturated fatty acids and resin acids—40-42, amine oxide—0.7-1, a high-molecular organic thermostabilizer—0.5-1, diesel fuel—the rest. Colloidal nanoparticles of silicon dioxide may comprise (% by vol.):
- silicon dioxide—31-32.5 in propylene glycol monomethyl ether—67-68, water—the rest, or
- silicon dioxide—30-31 in isopropanol—67-68 and methyl alcohol—the rest, or
- silicon dioxide—29-31 in ethylene glycol—the rest.

The principal physical parameters of systems and aqueous salt solutions are adjusted on the basis of volumes and densities of calculated components.

Two variants of process fluid injection into a well may be applied: direct or reverse. Traditionally, process fluids are injected into the well tubing space (direct injection). However, in the ESS case, the variant is reverse injection through the well hole annulus.

Process fluids should be injected continuously at a rate preventing reduction in densities of the process fluids by floating gas.

A process fluid injection rate is determined by a formation pressure value and should be maximum, greater than a well capacity, on the condition that a pressure in the well is not higher than an allowable limit (according to results of a string pressure test).

Required densities of the process fluids are determined on the basis of calculations on the condition that a column of the process fluids generates a pressure higher than a current formation pressure by the safety factor.

A quantity of dry potassium chloride or calcium chloride required for preparing a needed volume of an aqueous solution having a certain density can be calculated according to the formula:

$$M_r = \frac{Y_r * (Y_{kl} - Y_w) * V_s * 10}{Y_r - Y_w},$$

where:
$M_r$—reagent quantity, kg;
$Y_p$—reagent specific weight, g/cm$^3$;
$Y_{kl}$—specific weight of process killing fluid, g/cm$^3$;

$Y_w$—specific weight of process water used for preparation of process fluids, g/cm³;

$V_s$—required volume of an aqueous solution, m³.

As the final operations, the following works should be conducted at the well:
1. Check that all valves on the control equipment are closed.
2. Release pressure in the injection line, check that there is no excessive pressure.
3. Dismount the injection line avoiding spills of a process fluid (use of ecologically friendly pans is recommended).
4. Discharge pressure to the atmospheric value in the pipeline from the well to the group measuring unit.

Laboratory Studies of the ESS Physical Properties

In order to study the ESS physical properties, samples with different volumetric content of the components were prepared.

The following system parameters were determined in the experiments:
density;
thermal stability;
dynamic viscosity;
dynamic stability.

After the system samples were prepared, they were held at room temperature for at least 2 hours before starting the experiments.

Measuring ESS Density

The ESS sample densities were measured by the picnometric method (density of the water component was 1,200 kg/m³). The results are shown in FIG. 2.

Measuring ESS Thermal Stability

Thermal stability was measured by holding the ESS samples in graduated hermetically sealed cylinders in an oven for 8 hours, the temperature setting was 140° C. The test was considered as positive, if, after holding in the oven for 8 hours, not more than 2% by vol. of water was separated from the total volume of the ESS aqueous phase. It was experimentally determined that all the samples were stable.

Assessing ESS Rheological Properties

The results of dynamic viscosity and dynamic stability measurements of the ESS sample are shown in FIGS. 4 and 5. The measurements were taken with the use of a rotary viscometer PEOTECT RV 2.1 at 20° C. (temperature measurement error was ±0.1° C.).

The following parameters were determined:
effective (apparent) viscosity (mPa·s) by forward and reverse measurements;
shear stress (Pa) by forward and reverse measurements;
dynamic stability.

Proceeding from the results of the complex laboratory studies of the ESS physical properties, the basic properties of the developed systems were determined that confirmed their high thermal stability and controlled rheology.

EXEMPLARY EMBODIMENTS OF THE METHOD

Example 1

The preparatory works were performed on a well: the well was shut off, depressurized; operability of the stop valves on the wellhead equipment was checked; a value of the current formation pressure was determined; the equipment and tools were arranged according to the approved layout; the equipment connections were made, and the injection line was tested for a pressure 1.5 times greater than the expected operating pressure; the injection line was equipped with a check valve.

Upon completion of the preparatory works, the operation on the ESS injection into a producing well was started.

The ESS of the following composition (% by vol.) was injected into a gas well in the amount of 426 m³: diesel fuel—5, an emulsifier—2, colloidal nanoparticles of silicon dioxide—1.0, a potassium chloride aqueous solution with the density of 1,120 kg/m³—92.0. The emulsifier comprised, % by vol.: esters of higher unsaturated fatty acids (linoleic) and resin acids—40, amine oxide—0.7, a high-molecular organic thermostabilizer (lime-in-diesel fuel suspension)—0.5, diesel fuel—58.8. The colloidal nanoparticles of silicon dioxide comprised, % by vol.: silicon dioxide—31.0 in propylene glycol monomethyl ether—67.0, water—2.0.

The well was developed and put into operation with water-cut reduction by 47%.

Example 2

In this and further examples the preparatory works were performed in accordance with the procedure described in Example 1.

The ESS of the following composition (% by vol.) was injected into a gas well in the amount of 302 m³: diesel fuel—7, an emulsifier—2.5, colloidal nanoparticles of silicon dioxide—1.25, a potassium chloride aqueous solution with the density of 1,170 kg/m³—89.25. The emulsifier comprised, % by vol.: esters of higher unsaturated fatty acids (linoleic) and resin acids—41, amine oxide—0.8, a high-molecular organic thermostabilizer (lime-in-diesel fuel suspension)—0.7, diesel fuel—57.5. The colloidal nanoparticles of silicon dioxide comprised, % by vol.: silicon dioxide—32.0 in propylene glycol monomethyl ether—67.0, water—1.0.

The well was developed and put into operation with water-cut reduction by 53%.

Example 3

The ESS of the following composition (% by vol.) was injected into a gas well in the amount of 414 m³: diesel fuel—10, an emulsifier—3, colloidal nanoparticles of silicon dioxide—1.5, a potassium chloride aqueous solution with the density of 1,170 kg/m³—85.5. The emulsifier comprised, % by vol.: esters of higher unsaturated fatty acids (linoleic) and resin acids—42, amine oxide—1.0, a high-molecular organic thermostabilizer (lime-in-diesel fuel suspension)—1.0, diesel fuel—56.0. The colloidal nanoparticles of silicon dioxide comprised, % by vol.: silicon dioxide—32.5 in propylene glycol monomethyl ether—67.0, water—0.5.

The well was developed and put into operation with water-cut reduction by 39%.

Example 4

The ESS of the following composition (% by vol.) was injected into a gas well in the amount of 422 m³: diesel fuel—12, an emulsifier—3, colloidal nanoparticles of silicon dioxide—1.5, a potassium chloride aqueous solution with the density of 1,230 kg/m³—83.5. The emulsifier comprised, % by vol.: esters of higher unsaturated fatty acids (linoleic) and resin acids—42, amine oxide—1.0, a high-molecular organic thermostabilizer (lime-in-diesel fuel suspension)—1.0, diesel fuel—56.0. The colloidal nanoparticles of silicon dioxide comprised, % by vol.: silicon dioxide—31.0 in propylene glycol monomethyl ether—68.0, water—1.0.

The well was developed and put into operation with water-cut reduction by 62%.

Example 5

The ESS of the following composition (% by vol.) was injected into a gas well in the amount of 433 m³: diesel fuel—12, an emulsifier—3, colloidal nanoparticles of silicon dioxide—1.5, a potassium chloride aqueous solution with the density of 1,200 kg/m³—83.5. The emulsifier comprised, % by vol.: esters of higher unsaturated fatty acids (linoleic) and resin acids—42, amine oxide—0.8, a high-molecular organic thermostabilizer (bentonite-in-diesel fuel suspension)—0.9, diesel fuel—56.3. The colloidal nanoparticles of silicon dioxide nanoparticles comprised, % by vol.: silicon dioxide—30.0 in isopropanol—68 and methyl alcohol—2.0.

The well was developed and put into operation with water-cut reduction by 24%.

Example 6

The ESS of the following composition (% by vol.) was injected into a gas well in the amount of 378 m³: diesel fuel—11, emulsifier—2.8, colloidal nanoparticles of silicon dioxide—1.3, a potassium chloride aqueous solution with the density of 1,200 kg/m³—84.9. The emulsifier comprised, % by vol.: esters of higher unsaturated fatty acids (oleic) and resin acids—40, amine oxide—0.7, a high-molecular organic thermostabilizer (bentonite-in-diesel fuel suspension)—0.5, diesel fuel—58.8. The colloidal nanoparticles of silicon dioxide comprised, % by vol.: silicon dioxide—30.5 in isopropanol—67.5 and methyl alcohol—2.0.

The well was developed and put into operation with water-cut reduction by 31%.

Example 7

The ESS of the following composition (% by vol.) was injected into a gas well in the amount of 399 m³: diesel fuel—9, an emulsifier—2.5, colloidal nanoparticles of silicon dioxide—1.0, a calcium chloride aqueous solution with the density of 1,225 kg/m³—87.5. The emulsifier comprised, % by vol.: esters of higher unsaturated fatty acids (oleic) and resin acids—41, amine oxide—1.0, a high-molecular organic thermostabilizer (bentonite-in-diesel fuel suspension)—1.0, diesel fuel—57.0. The colloidal nanoparticles silicon dioxide comprised, % by vol.: silicon dioxide—31.0 in isopropanol—68 and methyl alcohol—1.0.

The well was developed and put into operation with water-cut reduction by 51%.

Example 8

The ESS of the following composition (% by vol.) was injected into a gas well in the amount of 415 m³: diesel fuel—7, an emulsifier—2.0, colloidal nanoparticles of silicon dioxide—1.4, a calcium chloride aqueous solution with the density of 1,225 kg/m³—89.6. The emulsifier comprised, % by vol.: esters of higher unsaturated fatty acids (oleic) and resin acids—40.5, amine oxide—0.8, a high-molecular organic thermostabilizer (bentonite-in-diesel fuel suspension)—0.6, diesel fuel—58.1. The colloidal nanoparticles silicon dioxide comprised, % by vol.: silicon dioxide—31.0 in ethylene glycol—69.0.

The well was developed and put into operation with water-cut reduction by 26%.

Example 9

The ESS of the following composition (% by vol.) was injected into a gas-condensate well in the amount of 415 m³: processed oil from an oil processing and pumping station—7, an emulsifier—2.0, colloidal nanoparticles of silicon dioxide—1.4, a calcium chloride aqueous solution with the density of 1,225 kg/m³—89.6. The emulsifier comprised, % by vol.: esters of higher unsaturated fatty acids (oleic) and resin acids—40.5, amine oxide—0.8, a high-molecular organic thermostabilizer (bentonite-in-diesel fuel suspension)—0.6, diesel fuel—58.1. The colloidal nanoparticles of silicon dioxide comprised, % by vol.: silicon dioxide—31.0 in isopropanol—67 and methyl alcohol—2.0.

The well was developed and put into operation with water-cut reduction by 25%.

Example 10

The ESS of the following composition (% by vol.) was injected into a gas-condensate well in the amount of 504 m³: processed oil from an oil processing and pumping station—9, an emulsifier—2.5, colloidal nanoparticles of silicon dioxide—1.5, a calcium chloride aqueous solution with the density of 1,210 kg/m³—87.0. The emulsifier comprised, % by vol.: esters of higher unsaturated fatty acids (oleic) and resin acids—42.0, amine oxide—0.7, a high-molecular organic thermostabilizer (bentonite-in-diesel fuel suspension)—1.0, diesel fuel—56.3. The colloidal nanoparticles of silicon dioxide comprised, % by vol.: silicon dioxide—31.0 in isopropanol—67 and methyl alcohol—2.0.

The well was developed and put into operation with water-cut reduction by 28%.

Example 11

The ESS of the following composition (% by vol.) was injected into a gas-condensate well in the amount of 508 m³: processed oil from an oil processing and pumping station—10, emulsifier—3.0, colloidal nanoparticles of silicon dioxide—1.2, a calcium chloride aqueous solution with the density of 1,210 kg/m³—85.8. The emulsifier comprised, % by vol.: esters of higher unsaturated fatty acids (oleic) and resin acids—40.0, amine oxide—0.7, a high-molecular organic thermostabilizer (bentonite-in-diesel fuel suspension)—1.0, diesel fuel—58.3. The colloidal nanoparticles of silicon dioxide comprised, % by vol.: silicon dioxide—29.0 in ethylene glycol—71.0.

The well was developed and put into operation with water-cut reduction by 43%.

Example 12

The ESS of the following composition (% by vol.) was injected into a gas-condensate well in the amount of 325 m³: processed oil from an oil processing and pumping station—12, an emulsifier—3.0, colloidal nanoparticles of silicon dioxide—1.0, a calcium chloride aqueous solution with the density of 1,220 kg/m³—84.0. The emulsifier comprised, % by vol.: esters of higher unsaturated fatty acids (linoleic) and resin acids—41.0, amine oxide—0.9, a high-molecular organic thermostabilizer (bentonite-in-diesel fuel suspension)—0.8, diesel fuel—57.3. The colloidal nanoparticles of silicon dioxide comprised, % by vol.: silicon dioxide—30.0 in ethylene glycol—70.0.

The well was developed and put into operation with water-cut reduction by 48%.

Example 13

The ESS of the following composition (% by vol.) was injected into a gas-condensate well in the amount of 376 m$^3$: processed oil from an oil processing and pumping station—12, an emulsifier—3.0, colloidal nanoparticles of silicon dioxide—1.5, a potassium chloride aqueous solution with the density of 1,220 kg/m$^3$—83.5. The emulsifier comprised, % by vol.: esters of higher unsaturated fatty acids (linoleic) and resin acids—41.0, amine oxide—0.9, a high-molecular organic thermostabilizer (bentonite-in-diesel fuel suspension)—0.8, diesel fuel—57.3. The colloidal nanoparticles of silicon dioxide comprised, % by vol.: silicon dioxide—31.0 in ethylene glycol—69.0.

The well was developed and put into operation with water-cut reduction by 55%.

Example 14

The ESS of the following composition (% by vol.) was injected into a gas-condensate well in the amount of 361 m$^3$: processed oil from an oil processing and pumping station—5, emulsifier—2.0, colloidal nanoparticles of silicon dioxide—1.0, a potassium chloride aqueous solution with the density of 1,220 kg/m$^3$—92.0. The emulsifier comprised, % by vol.: esters of higher unsaturated fatty acids (linoleic) and resin acids—42.0, amine oxide—1.0, a high-molecular organic thermostabilizer (bentonite-in-diesel fuel suspension)—1.0, diesel fuel—56.0. The colloidal nanoparticles of silicon dioxide nanoparticles comprised, % by vol.: silicon dioxide—31.0 in ethylene glycol—69.0.

The well was developed and put into operation with water-cut reduction by 31%.

Example 15

The ESS of the following composition (% by vol.) was injected into a gas-condensate well in the amount of 452 m$^3$: processed oil from an oil processing and pumping station—6, an emulsifier—3.0, colloidal nanoparticles of colloidal silicon dioxide—1.4, a potassium chloride aqueous solution with the density of 1,220 kg/m$^3$—89.6. The emulsifier comprised, % by vol.: esters of higher unsaturated fatty acids (linoleic) and resin acids—42.0, amine oxide—1.0, a high-molecular organic thermostabilizer (bentonite-in-diesel fuel suspension)—1.0, diesel fuel—56.0. The colloidal nanoparticles of silicon dioxide comprised, % by vol.: silicon dioxide—31.0 in ethylene glycol—69.0.

The well was developed and put into operation with water-cut reduction by 47%.

Example 16

The ESS of the following composition (% by vol.) was injected into a gas-condensate well in the amount of 445 m$^3$: processed oil from an oil processing and pumping station—5, emulsifier—3.0, colloidal nanoparticles of silicon dioxide—1.5, a potassium chloride aqueous solution with the density of 1,210 kg/m$^3$—90.5. The emulsifier comprised, % by vol.: esters of higher unsaturated fatty acids (oleic) and resin acids—42.0, amine oxide—1.0, a high-molecular organic thermostabilizer (bentonite-in-diesel fuel suspension)—1.0, diesel fuel—56.0. The colloidal nanoparticles of silicon dioxide comprised, % by vol.: silicon dioxide—31.0 in propylene glycol monomethyl ether—67.0, water—2.0.

The well was developed and put into operation with water-cut reduction by 34%.

Example 17

The ESS of the following composition (% by vol.) was injected into a gas-condensate well in the amount of 380 m$^3$: processed oil from an oil processing and pumping station—12, emulsifier—2.0, colloidal nanoparticles of silicon dioxide—1.2, a potassium chloride aqueous solution with the density of 1,210 kg/m$^3$—84.8. The emulsifier comprised, % by vol.: esters of higher unsaturated fatty acids (oleic) and resin acids—42.0, amine oxide—1.0, a high-molecular organic thermostabilizer (bentonite-in-diesel fuel suspension)—1.0, diesel fuel—56.0. The colloidal nanoparticles of silicon dioxide comprised, % by vol.: silicon dioxide—32.0 in propylene glycol monomethyl ether—67.0, water—1.0.

The well was developed and put into operation with water-cut reduction by 52%.

Example 18

The ESS of the following composition (% by vol.) was injected into a gas-hydrate well in the amount of 1,080 m$^3$: processed oil from an oil processing and pumping station—9.0, an emulsifier—2.5, colloidal nanoparticles of silicon dioxide—1.5, a potassium chloride aqueous solution with the density of 1,205 kg/m$^3$—87.0. The emulsifier comprised, % by vol.: esters of higher unsaturated fatty acids (oleic) and resin acids—41.0, amine oxide—0.7, a high-molecular organic thermostabilizer (bentonite-in-diesel fuel suspension)—0.5, diesel fuel—57.8. The colloidal nanoparticles silicon dioxide comprised, % by vol.: silicon dioxide—32.5 in propylene glycol monomethyl ether—67.0, water—0.5.

The well was developed and put into operation with water-cut reduction by 27%.

Example 19

The ESS of the following composition (% by vol.) was injected into a gas-hydrate well in the amount of 905 m$^3$: processed oil from an oil processing and pumping station—5.0, an emulsifier—3.0, colloidal nanoparticles of silicon dioxide—1.5, a potassium chloride aqueous solution with the density of 1,190 kg/m$^3$—90.5. The emulsifier comprised, % by vol.: esters of higher unsaturated fatty acids (oleic) and resin acids—41.0, amine oxide—0.7, a high-molecular organic thermostabilizer (bentonite-in-diesel fuel suspension)—0.5, diesel fuel—57.8. The colloidal nanoparticles of silicon dioxide comprised, % by vol.: silicon dioxide—30.0 in isopropanol—68 and methyl alcohol—2.0.

The well was developed and put into operation with water-cut reduction by 44%.

Example 20

The ESS of the following composition (% by vol.) was injected into a gas-hydrate well in the amount of 982 m$^3$: processed oil from an oil processing and pumping station—8.0, an emulsifier—3.0, colloidal nanoparticles of silicon dioxide—1.3, a calcium chloride aqueous solution with the density of 1,190 kg/m$^3$—87.7. The emulsifier comprised, % by vol.: esters of higher unsaturated fatty acids (oleic) and resin acids—41.5, amine oxide—0.9, a high-molecular organic thermostabilizer (lime-in-diesel fuel suspension)—1.0, diesel fuel—56.6. The colloidal nanoparticles of silicon dioxide comprised, % by vol.: silicon dioxide—30.5 in isopropanol—67.5 and methyl alcohol—2.0.

The well was developed and put into operation with water-cut reduction by 40%.

Example 21

The ESS of the following composition (% by vol.) was injected into a gas-hydrate well in the amount of 1,095 m$^3$: processed oil from an oil processing and pumping station—10.0, an emulsifier—2.5, colloidal nanoparticles of silicon dioxide—1.2, a calcium chloride aqueous solution with the density of 1,175 kg/m$^3$—86.3. The emulsifier comprised, % by vol.: esters of higher unsaturated fatty acids (oleic) and resin acids—42.0, amine oxide—1.0, a high-molecular organic thermostabilizer (lime-in-diesel fuel suspension)—0.7, diesel fuel—56.3. The colloidal nanoparticles of silicon dioxide nanoparticles comprised, % by vol.: silicon dioxide—31.0 in isopropanol—68 and methyl alcohol—1.0.

The well was developed and put into operation in the water-free condition with water-cut reduction by 38%.

Thus, the disclosure enables to optimize the process of treatment of the productive formation bottomhole zone, reduce water-cut of well products, reduce harmful impact on the environment owing to reversible nature of the shielding agent blocking effect, simplify implementation of the method due to its one-stage process, adjust the shielding agent rheological parameters, reduce labor inputs and improve technological efficiency of operation of gas, gas-condensate, or gas-hydrate wells.

The invention claimed is:

1. A method for preventing stratal water from breaking into bottom holes of gas, gas-condensate, or gas-hydrate wells, comprising:
    performing an injection of a shielding agent into a bottomhole formation zone to create a shield impermeable for stratal water filtering into a near-wellbore zone of a productive formation, for which an emulsion-suspension system (ESS) containing colloidal nanoparticles of silicon dioxide is used, the system comprising:
    5-12 vol % diesel fuel,
    2-3 vol % emulsifier,
    1.0-1.5 vol % colloidal nanoparticles of silicon dioxide,
    and the rest of the emulsion-suspension system being an aqueous solution of calcium chloride or potassium chloride,
    wherein the emulsifier comprises:
        40-42 vol % esters of linoleic or oleic acids,
        0.7-1 vol % amine oxide,
        0.5-1 vol % lime-in-diesel fuel suspension or bentonite-in-diesel fuel suspension, and the rest being diesel fuel, and
    wherein the colloidal nanoparticles of silicon dioxide comprise:
        31-32.5 vol % silicon dioxide in 67-68 vol % propylene glycol monomethyl ether, and the rest being water, or
        30-31 vol % silicon dioxide in 67-68 vol % isopropanol and the rest being methyl alcohol, or
        29-31 vol % silicon dioxide in ethylene glycol, and the rest being ethylene glycol.

2. An emulsion-suspension system (ESS) for preventing stratal water from breaking into bottom holes of gas, gas-condensate, or gas-hydrate wells, containing colloidal nanoparticles of silicon dioxide, the system comprising:
    5-12 vol % diesel fuel,
    2-3 vol % emulsifier,
    1.0-1.5 vol % colloidal nanoparticles of silicon dioxide,
    and the rest of the emulsion-suspension system being an aqueous solution of calcium chloride or potassium chloride,
    wherein the emulsifier comprises:
        40-42 vol % esters of linoleic or oleic acids and resin acids,
        0.7-1 vol % amine oxide,
        0.5-1 vol % lime-in-diesel fuel suspension or bentonite-in-diesel fuel suspension, and the rest being diesel fuel, and
    wherein the colloidal nanoparticles of silicon dioxide comprise:
        31-32.5 vol % silicon dioxide in 67-68 vol % propylene glycol monomethyl ether, and the rest being water, or
        30-31 vol % silicon dioxide in 67-68 vol % isopropanol and the rest being methyl alcohol, or
        29-31 vol % silicon dioxide in ethylene glycol, and the rest being ethylene glycol, wherein the ESS forms a shield impermeable for stratal water filtering into a near-wellbore zone of a productive formation.

* * * * *